United States Patent Office 3,248,358
Patented Apr. 26, 1966

3,248,358
PROCESS FOR PRODUCING AMINOSILICONE-CONTAINING VINYL HALIDE POLYMER COATING COMPOSITIONS
Theodore R. Smith, Charleston, W. Va., and Arthur N. Pines, Snyder, N.Y., assignors to Union Carbide Corporation, a corporation of New York
No Drawing. Filed Dec. 23, 1960, Ser. No. 77,798
13 Claims. (Cl. 260—41)

This invention relates to the production of coating compositions for metal surfaces and, in particular, to the production of aminosilicone-containing vinyl halide polymer coating compositions that are uniquely suited for producing adherent protective coatings on metal surfaces.

Conventional coating compositions containing vinyl halide polymers [e.g., solutions, organosols and plastisols containing vinyl chloride polymers and organic solvents (i.e., liquid organic compounds in which the vinyl halide polymers are soluble and that provide the continuous phases in the coating compositions)] have been found to be satisfactory for the production of coatings on some surfaces (e.g., on fibrous surfaces) but such compositions have been found to be unsatisfactory for the production of coatings on other surfaces, particularly on metal surfaces. In particular, the coatings produced on metal surfaces from conventional vinyl halide polymer coating compositions are unsatisfactory since they exhibit poor adhesion to the surfaces.

Heretofore attempts have been made to improve the adhesion of coatings on metal surfaces produced from conventional vinyl halide coating compositions. Such attempts have involved either pre-treating the metal surface (e.g., with a phenolic material) or incorporating adhesion promoting additives (e.g., a copolymer of vinyl chloride, vinyl acetate and maleic acid) into the compositions. Such attempts have not achieved satisfactory adhesion of the coatings to metal surfaces particularly when the coated surface is exposed to severe conditions in use (e.g., abrasion, severe impacts or prolonged contact with hot water, particularly saline water, or prolonged contact with hot, humid air). Moreover, pre-treatment of the metal surface before applying a coating composition involves an additional process step and hence is commercially undesirable.

Recently it has been found that remarkably adherent coatings on metal surfaces can be produced from vinyl halide polymer coating compositions containing: (1) a film-forming vinyl halide polymer, (2) an amino-organosilicon compound (i.e., a hydrocarbonoxysilane or a siloxane) having a primary or a secondary amino group that is bonded to a silicon atom through at least three successive carbon atoms of a divalent hydrocarbon group and (3) an organic solvent. The coatings on metal surfaces produced from these latter compositions adhere to the surfaces even when the surfaces are exposed to severe conditions in use.

Although the above-mentioned aminosilicone-containing vinyl halide polymer coating compositions leave little to be desired from the standpoint of the adherence of the coatings produced therefrom to metal surfaces, economic considerations indicate the desirability of reducing the amount of the relatively expensive aminosilicone component to a minimum that is commensurate with the attainment of satisfactory adhesion. Moreover, a minimum amount of the amino-organosilicon compound in these compositions is also desirable since there is a tendency of the coatings produced from the compositions to discolor and the amount of discoloration is proportional to the amount of the amino-organosilicon compound in the composition.

This invention is based on the discovery that, when the vinyl halide polymer and the amino-organosilicon compound are first admixed in the absence of the organic solvent and the admixture so formed is then mixed with the organic solvent in the production of the above-mentioned aminosilicone-containing vinyl halide polymer coating compositions, considerably less amino-organosilicon compound is required to achieve a given degree of adhesion of the coating produced from the composition to metal surfaces than is required when the polymer, amino-organosilicon compound and the solvent are mixed in any other sequence. Stated differently, it has been found that the ability of the amino-organosilicon compound to improve the adhesion of the coatings on metal surfaces produced from these compositions is greatly increased when the indicated sequence of mixing the amino-organosilicon compound, the vinyl halide polymer and the organic solvent is observed. Consequently, to achieve any given desired degree of adhesion, considerably less amino-organosilicon compound is required when the components of these compositions are mixed in the indicated order.

In accordance with the practice of the present invention, the admixture of the vinyl halide polymer and the amino-organosilicon compound is formed in the absence of the organic solvent in any convenient manner.

The preferred manner of forming the admixture of the vinyl halide polymer and the amino-organosilicon polymer in the practice of the present invention is to admix or blend a substantially dry film forming vinyl halide polymer and the amino-organosilicon compound. The method is referred to herein as the "blending method." This admixing or blending can be accomplished in any suitable apparatus, (e.g., in a paddle mixer, in a high shear propeller type mixer or in a ribbon blender). The amino-organosilicon compound can be added as such or in the form of an aqueous or alcohol solution (e.g., a solution containing from 0.5 to 20 parts by weight of the amino-organosilicon compound dissolved in 100 parts by weight of water or an alkanol such as ethanol or isopropanol). Vinyl halide polymers are substantially insoluble in alcohols, and are not appreciably solvated by alcohols. The water or alcohol is preferably removed from the admixture (e.g., by heating the admixture to a temperature sufficiently elevated to volatilize the water or the alcohol) before the admixture is mixed with the organic solvent to produce a coating composition.

Another manner of forming the admixture of the vinyl halide polymer and the amino-organosilicon compound in the practice of the present invention is adding the amino-organosilicon compound to a suspension of the vinyl halide polymer in water and then removing the water. This method is referred to herein as the "suspension method." Suitable suspensions (or latices) include those that are produced when the vinyl halide polymer is produced by conventional emulsion polymerization methods.

Suspensions that are suitable for use in this invention can contain from 1 to 200 parts by weight of the vinyl halide polymer per 100 parts by weight of the water. More desirably, the suspensions contain from 40 to 70 parts by weight of the vinyl halide polymer per 100 parts by weight of the water.

Suspensions that are suitable for use in the present invention can contain the surfactants which are customarily present in the latices produced in the production of vinyl halide polymers by conventional emulsion polymerization methods. Such surfactants are conventionally used to prevent the precipitation of the vinyl halide polymer and, in the practice of the present invention, such surfactants are especially useful in this regard since the tendency of the vinyl halide polymer to precipitate or to coagulate (with resultant thickening of the latex) is increased by the addition of the amino-organosilicon compound to the latex.

Surfactants that can be employed in the suspensions that are suitable for use in the present invention include alkali metal alkyl sulfates (i.e., compounds having the formula $(M)(R)SO_4$ wherein M is an alkali metal and R is an alkyl group containing from 8 to 18 carbon atoms) and dialkyl-esters of dicarboxylic aliphatic acids containing —$SO_3M$ groups as substituents. Illustrative of such surfactants are sodium tetradecyl sulfate [$(Na)(C_{14}H_{29})SO_4$], sodium lauryl sulfate $$[(Na)(C_{12}H_{25})SO_4]$$

and sodium dioctyl sulfosuccinate $$[C_8H_{17}OOCCH_2CH(SO_3Na)COOC_8H_{17}]$$

These surfactants can be present in the suspensions in an amount from 0.05 part to 10 parts per 100 parts by weight of the polymer. More desirably, these surfactants are present in an amount from 0.3 part to 5 parts by weight per 100 parts by weight of the polymer. The entire amount of the surfactant is preferably added to the suspension before the addition of any of the amino-organosilicon compound. In general, the amount of surfactant used is proportional to the concentration of the vinyl halide polymer and the amino-organosilicon compound in the suspension. The surfactant can be added to the suspension as such or in the form of an aqueous solution. Precipitation of the vinyl halide polymer from the suspension or thickening of the suspension is highly undesirable since it creates numerous difficulties in subsequent attempts to produce dry vinyl halide polymers of the particle size desirable for use in coating compositions that are in the form of plastisols or organosols.

Protective colloids (e.g., gelatin) can be added to the above-described suspensions in lieu of or in addition to the above-mentioned surfactants to prevent precipitation or coagulation of the vinyl halide polymer.

The amino-organosilicon compound can be added to the above-described suspensions in the practice of the present invention by any suitable means. Preferably the amino-organosilicon compound is added to the suspension in small increments in the form of an aqueous solution (e.g., from 0.5 to 5 parts by weight of the amino-organosilicon compounds dissolved in 100 parts by weight of water) while the suspension is thoroughly agitated. In this manner, high local concentrations of the amino-organosilicon compound are avoided and so tendency of the vinyl halide polymer to precipitate or coagulate is minimized.

After the amino-organosilicon compound has been added to a suspension of a vinyl halide polymer in water in accordance with the practice of this invention, the water and any alcohol (e.g., alcohol formed by the hydrolysis of any silicon-bonded hydrocarbonoxy groups of the amino-organosilicon compound) is removed. Any of the methods conventionally used to remove water from the latices formed in the production of vinyl halide polymer by conventional emulsion polymerization methods are applicable. Preferably, the water and any alcohol is removed by spray drying which involves producing a spray of small droplets of the suspension (e.g., by forcing the suspension through a perforated surface such as a nozzle) and introducing the spray into a heated chamber (90° C.–200° C.) where the water and any alcohol volatilizes. After the removal of the water and any alcohol, there remains a solid, dry admixture of the vinyl halide polymer and the amino-organosilicon compound. Any surfactant that was present in the suspension is also present in the dry admixture. Satisfactory coating compositions can be produced without removing such surfactants. The dry admixture can be ground to the desired particle size by conventional grinding methods.

The relative amount of the amino-organosilicon compound and the vinyl halide polymer used in the practice of the present invention is not narrowly critical. In general from 0.05 to 25 parts by weight of the amino-organosilicon compound per 100 parts by weight of the vinyl halide polymer are preferred. More desirably, from 0.2 to 5 parts by weight of the amino-organosilicon per 100 parts by weight of the vinyl halide polymer are employed. Other than these relative amounts can be employed, if desired, but no commensurate advantage is gained thereby.

After the admixture of the vinyl halide polymer and the amino-organosilicon compound has been formed in accordance with the present invention as described above (e.g., by the blending method or by the suspension method), the admixture can be mixed with an organic solvent to produce a coating composition. Such mixtures can be formed in any suitable manner (e.g., grinding all the components in a pebble mill). The adhesion of coatings produced from compositions so prepared with a given amount of amino-organosilicon compound to metal surfaces is comparable to the adhesion achieved when coating compositions are prepared by mixing the vinyl halide polymer, about four times the amount of the amino-organosilicon compound and the organic solvent in any other sequence.

The vinyl halide polymers that are useful in the present invention include homopolymeric vinyl halide polymers (e.g., homopolymeric vinyl chloride polymers and homopolymeric vinyl fluoride polymers) and copolymeric vinyl halide polymers (e.g., copolymeric vinyl chloride polymers and copolymeric vinyl fluoride polymers). Suitable copolymeric vinyl halide polymers are preferably composed of at least 60 parts by weight of copolymerized vinyl halide per 100 parts by weight of the polymer and up to 40 parts by weight of another copolymerized olefinically unsaturated compound per 100 parts by weight of the polymer. More desirably, the copolymeric vinyl halide polymers are composed of at least 85 parts by weight of copolymerized vinyl halide per 100 parts by weight of the polymer and up to 15 parts by weight of another copolymerized olefinically unsaturated compound per 100 parts by weight of the polymer. The compounds that can be copolymerized with vinyl halides to produce suitable copolymeric vinyl halide polymers include vinylidene halides (e.g., vinylidene chloride and vinylidene bromide), alkenyl esters of alkanoic acids (e.g., vinyl acetate) alkenyl benzoates (e.g., vinyl benzoate), alkyl acrylates (e.g., methyl acrylate, ethyl acrylate, butyl acrylate and octyl acrylate), alkyl methacrylates (e.g. methyl methacrylate, ethyl methacrylate, butyl methacrylate and octyl methacrylate) dialkyl esters of olefinically unsaturated dicarboxylic acids (e.g., dimethyl maleate and diethyl fumarate), alkenyl cyanides (e.g., acrylonitrile), tetrahaloethylenes (e.g., chlorotrifluoroethylene), amides of olefinically unsaturated aliphatic carboxylic acids (e.g., acryl amide and N,N-dimethyl methacrylamide) aralkenes (e.g., styrene and vinyl naphthylene), alkenyl alkyl ethers (e.g., vinyl methyl ether), alkenyl alkyl ketones (e.g. vinyl methyl ketone), alkenes (e.g., ethylene) and alkenyl substituted heterocylclic compounds (e.g., vinyl pyridine).

A single vinyl halide polymer or a mixture of vinyl halide polymers can be used in the present invention.

The preferred vinyl halide polymers are homopolymeric vinyl chloride polymers and copolymeric vinyl chloride polymers. The latter polymers preferably contain vinyl chloride copolymerized with vinyl acetate and vinylidene chloride.

Vinyl halide polymers that are suitable for use in the present invention are capable of forming films when applied to metal surfaces in the form of a lacquer, paste or dope and then cured. Such films can be self-supporting but they need not necessarily have that property. Hence these vinyl halide polymers can be described as "film forming." Suitable vinyl halide polymers preferably have specific viscosities (measured using a solution of one gram of the polymer dissolved in 100 milliliters of nitrobenzene or methyl isobutyl ketone) from 0.15 to 0.30 and, even more desirably, can have specific viscosities from 0.18 to 0.26 (measured as described).

Vinyl halide polymers that are suitable for use in the blending method of the present invention for producing admixtures to be used in coating compositions that are organosols or plastisols are preferably in a particulate form. Particulate vinyl halide polymers having an average particle size from 0.1 to 100 microns are preferred but it is even more desirable that the particulate vinyl halide polymer has a particle size from 0.1 to 20 microns. In the suspension method of practicing the present invention, the aminosilicone-vinyl halide polymer admixture can be formed into these particle sizes for organosol or plastisol use by conventional means after the amino-organosilicon compound is added to the suspension (e.g., by properly regulating the manner of spray drying and grinding).

The amino-organosilicon compounds that are suitable for use in the present invention are amino-organohydrocarbonoxysilanes or amino-organosiloxanes having a primary or a secondary amino group that is bonded to a silicon atom through at least three successive carbon atoms of a divalent hydrocarbon group.

The amino-organo(hydrocarbonoxy)silanes that are useful in the present invention are represented by the formula:

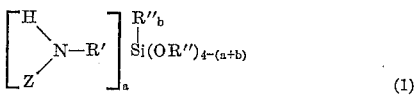
(1)

wherein Z is a hydrogen atom or an monovalent hydrocarbon group having from 0 to 1 amino groups, from 0 to 1 hydroxy groups and from 0 to 1 hydrocarbonoxy groups as substituents, R' is a divalent hydrocarbon group, R'' is a monovalent hydrocarbon group, the

group is attached to the silicon atom through at least three successive carbon atoms of the group represented by R', $a$ has a value from 1 to 3 inclusive, $b$ has a value from 0 to 2 inclusive and $(a+b)$ has a value from 1 to 3 inclusive.

The amino-organosiloxanes that are useful in the present invention include those siloxanes that are composed essentially of groups having the formula:

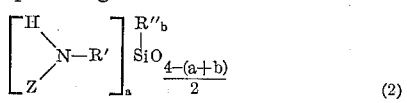
(2)

wherein Z, R', R'' $a$, $b$, $(a+b)$ and the position of the

group are as defined above.

The amino-organosiloxanes that are useful in the present invention also include those siloxanes that are composed essentially of from 0.1 to 99.9 mole percent of groups represented by Formula 2 and from 0.1 to 99.9 mole percent of groups represented by the formula:

(3)

wherein R''' is a monovalent hydrocarbon group and $c$ has a value from 0 to 3 inclusive. Preferably these latter siloxanes are composed of from 25 to 99.9 mole percent of groups represented by Formula 2 and from 0.1 to 75 mole per cent of groups represented by Formula 3.

Illustrative of the monovalent hydrocarbon groups represented by Z and R'' in Formulae 1 and 2 and R''' in Formula 3 are the linear alkyl groups (for example, the methyl, ethyl, propyl, butyl and octadecyl groups), the cyclic alkyl groups (for example, the cyclohexyl and cyclopentyl groups), the linear alkenyl groups (for example, the vinyl and the butenyl groups), the cyclic alkenyl groups (for example, the cyclopentenyl and the cyclohexenyl groups), the aryl groups (for example, the phenyl and naphthyl groups), the alkaryl groups (for example, the tolyl group) and the aralkyl groups (for example, the benzyl and beta-phenylethyl groups).

Illustrative of the amino-substituted monovalent hydrocarbon groups represented by Z in Formula 1 are the aminoalkyl groups (such as the gamma-aminopropyl, delta-aminobutyl, gamma-aminoisobutyl and epsilon-aminopentyl groups), and the N-hydrocarbon-aminoalkyl groups (such as the N-methylgamma-aminopropyl groups and the N,N-diphenyl-delta-aminobutyl group). Illustrative of the hydroxy-substituted monovalent hydrocarbon groups represented by Z in Formula 1 are the hydroxyalkyl groups (such as the beta-hydroxyethyl and the beta-hydroxypropyl groups). Compounds having such hydroxy substituted groups can be produced by reacting a primary amino-organosilicon compound and an epoxide (no more than one epoxy group reacted per primary amino group). Illustrative of the alkoxy-substituted monovalent hydrocarbon groups represented by Z in Formula 1 are the gamma-methoxypropyl and the gamma-ethoxypropyl groups.

Illustrative of the divalent hydrocarbon groups represented by R' in Formula 1 are the linear alkylene groups (for example, the trimethylene, $-(CH_2)-$, and the octadecamethylene, $-(CH_2)_{18}-$ groups), the arylene groups (for example, the naphthylene, $-C_{10}H_6-$ and paraphenylene, $-C_6H_4-$ groups); the cyclic alkylene groups (for example, the cyclohexylene, $-C_6H_{10}-$ group); the alkarylene groups (for example, the tolylene, $-CH_3C_6H_3-$ group) and the aralkylene groups (for example, the $-CH_2(C_6H_5)CHCH_2CH_2-$ group).

The phrases "monovalent hydrocarbon group" and "divalent hydrocarbon group" are employed herein in the generic sense to denote both unsubstituted and substituted (e.g., $NH_2$, OH and OR'' substituted) groups.

Illustrative of the amino-organo(hydrocarbonoxy)-silanes represented by Formula 1 are gamma-aminopropyltriethoxysilane, gamma-aminopropyl(methyl)diethoxysilane, gamma-aminopropyldimethyl(ethoxy)silane, delta-aminobutyltriethoxysilane, delta - aminobutyl(methyl)diethoxysilane, delta-aminobutyldimethyl(ethoxy)silane, N-methyl - gamma - aminoisobutyltriethoxysilane, epsilon-aminopentyltriethoxysilane, ortho-aminophenylmethyltripropoxysilane, para - aminophenyldiphenyl(phenoxy)silane, N-beta-aminoethyl-gamma-aminopropyltriethoxysilane (i.e., $H_2NCH_2CH_2NH(CH_2)_3Si(OC_2H_5)_3$, and N-gamma-aminopropyl - gamma - aminopropyltriethoxysilane (i.e., $H_2N(CH_2)_3NH(CH_2)_3Si(OC_2H_5)_3$.

Illustrative of the groups represented by Formula 2 are the gamma - aminopropylsiloxy, gamma - aminopropyl-(methyl)siloxy (i.e., $H_2N(CH_2)_3Si(CH_3)O$), gamma-aminopropyldimethylsiloxy, delta-aminobutyldimethylsiloxy, delta-aminobutyl(methyl)siloxy, delta-aminobutyldimethylsiloxy, N-methyl-gamma-aminoisobutylsiloxy, epsilon-aminopentylsiloxy, para-aminophenylmethylsiloxy (i.e., $H_2NC_6H_4CH_2SiO_{1.5}$)

para - aminophenyldiphenylsiloxy, N - beta - aminoethyl-gamma-aminopropylsiloxy (i.e., $H_2NCH_2CH_2NH(CH_2)_3SiO_{1.5}$)

and N-gamma-aminopropyl - gamma - aminopropylsiloxy (i.e., $H_2N(CH_2)_3NH(CH_2)_3SiO_{1.5}$) groups.

Illustrative of the groups represented by Formula 3 are the $SiO_2$, methylsiloxy, dimethylsiloxy, trimethylsiloxy, vinylsiloxy, amylsiloxy, diphenylsiloxy, methyldiphenylsiloxy, vinyl(ethyl)siloxy (i.e., $CH_2=CHSi(C_2H_5)O$)

and beta-phenylethyl(methyl)siloxy (i.e., $C_6H_5CH_2CH_2Si(CH_3)O$)

groups.

The silicon atom in each group represented by Formulae 2 and 3 in the above-described amino-organosiloxanes is bonded through at least one oxygen atom to at least one other silicon atom. In addition to the substituents indicated in these formulae, some or all of the silicon atoms in the groups represented by Formulae 2 and 3 can be bonded by any remaining valences to hydrogen atoms through oxygen (in which case the siloxane contains the Si—OH group) and some or all of the silicon atoms in the groups represented by the Formulae 2 and 3 can be bonded by any remaining valences to monovalent hydrocarbon groups through oxygen (in which case the siloxane contains the Si-OR" group). These siloxanes can also contain silicon-bonded hydrogen atoms (i.e., SiH).

The above-described amino-organosiloxanes preferably have an organic group to silicon atom ratio from 0.5:1 to 2.8:1 and even more desirably have an organic group to silicon atom ratio from 0.9:1 to 2.5:1. These siloxanes can be linear, cyclic or cross-linked in structure and they contain a total of at least 2 and up to from 100 to 1000 or more siloxane groups.

A silane having the formula:

$$R_c'''Si(OR'')_{4-c} \quad (4)$$

wherein $R'''$, $R''$ and $c$ have the above-defined meanings can be present in the coating compositions of this invention along with silanes represented by Formula 1. Illustrative of the silanes represented by Formula 4 are methyltriethoxysilane, dimethyldiethoxysilane, trimethylethoxysilane, vinyltriethoxysilane, benzyltripropoxysilane, phenyl(methyl)dipropoxysilane, phenyltriethoxysilane and diphenyldiethoxysilane.

The amino-organo(hydrocarbonoxy)silanes that are preferred for use in the present invention are those silanes within the scope of Formula 1 which are more specifically depicted by the formula:

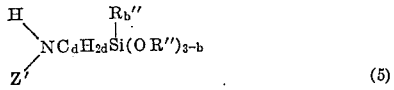

(5)

wherein $d$ has a value of at least 3 and preferably has a value from 3 to 5 inclusive, $C_dH_{2d}$ is an alkylene group, the

group is bonded to the silicon atom through at least three carbon atoms of the $C_dH_{2d}$ group, $Z'$ is hydrogen or an aminoalkyl group (e.g., a beta-aminoethyl, gamma-aminopropyl or delta-amino-butyl group), and $R''$ and $b$ have the above-defined meanings.

The amino-organosiloxanes that are preferred for use in the present invention are those siloxanes containing those groups within the scope of Formula 2 which are more specifically depicted by the formula:

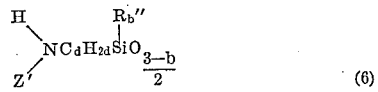

(6)

wherein $d$, $C_dH_{2d}$, $Z'$, the position of the

group, $R''$ and $b$ are as defined above.

The above-described amino-organosilicon compounds can generally be produced by known processes (e.g., by reducing the corresponding cyano-organosilicon compounds or by reacting the corresponding halo-organosilicon compounds with ammonia or primary amines).

Silanes represented by Formula 1 where Z is an amino-substituted monovalent hydrocarbon group can be produced by reacting a diamine and a halo-organo(hydrocarbonoxy)silane under anhydrous conditions with three moles of the diamine being present per mole of the silane at a temperature from 50° C. to 300° C. [(e.g., ethylene diamine can be reacted with gamma-chloropropyltriethoxysilane under the indicated conditions to produce $H_2NCH_2CH_2NH(CH_2)_3Si(OC_2H_5)_3$].

Amino-organosilicon compounds wherein the only amino groups that are linked to silicon through at least three successive carbon atoms of a divalent hydrocarbon group are tertiary amino groups [e.g., $(C_2H_5)_2N(CH_2)_3Si(OC_2H_5)_3$]

are not useful in improving the adherence to metal surfaces of coatings formed from vinyl halide polymer coating compositions. Apparently, the nitrogen-bonded hydrogen atoms of the primary and secondary amino-organosilicon compound employed in the present invention undergo a reaction during the curing of coating compositions on metal surfaces and this reaction accounts, at least in part, for the superior adhesion of the coatings produced from these compositions. Without wishing to be bound by any particular theory, the curing may involve the reaction of such hydrogen atoms with the halogen atoms of the vinyl halide polymer.

Coating compositions containing the admixtures produced in accordance with the present invention can contain the above-described vinyl halide polymers and amino-organosilicon compounds and one or more of a wide variety of organic solvents. Such organic solvents include both liquid organic compounds in which the vinyl halide polymer is soluble at room temperature and also liquid organic compounds in which the vinyl halide polymer is soluble only at elevated temperatures (e.g., at the temperatures at which the coating composition may be heated to produce a coating after it has been applied to a metal surface). When a coating composition is formed at room temperature by mixing a solvent of the former type, a vinyl halide polymer and an amino-organosilicon compound, the composition is in the form of a solution and, when a coating composition is formed at room temperature by mixing a solvent of the latter type, a vinyl halide polymer and an amino-organosilicon compound, the composition is in the form of a dispersion (e.g., an organosol or a plastisol). In either case, the solvent is the continuous phase in the composition. The solvent can be a relatively volatile compound that volatilizes during curing or the solvent can be a relatively non-volatile compound that does not volatilize during curing and that forms a permanent part of the coating. When the sole solvent or major part of the solvent in the coating composition is a compound of the former type, the composition is a solution or an organosol and, when the sole solvent or the major part of the solvent is a compound of the latter type, the composition is a plastisol. The solvents used are free of alcohols since alcohols have undesirable properties (e.g., they cause undesirable coagulation of the compositions and vinyl halide polymers are not appreciably soluble therein). Within the contemplation of the present invention, a vinyl halide polymer is soluble in an organic solvent if the polymer can be either dissolved by the solvent to form a solution or solvated by the solvent. The latter phenomenon (solvation) occurs when the organic solvent is a plasticizer.

Suitable solvents for use in the above-described amino-silicone-containing vinyl halide polymer coating compositions include dialkyl ketones (e.g., diisobutyl ketone, methyl ethyl ketone, methyl isobutyl ketone), nitroalkanes (e.g. 2-nitropropane), dialkyl phthalates (e.g. di(2 - ethylhexyl)ortho - phthalate, di(n - octyl)ortho-phthalate and di(2-ethylhexyl)meta-phthalate), triaryl phosphates (e.g. tricresyl phosphate) and dialkyl adipates (e.g. di(2-ethylhexyl)adipate), and halohydrocarbons (e.g. ethylene dichloride). A single organic solvent or mixtures of organic solvents can be used.

The amount of such solvents that are mixed with the vinyl halide polymer and the amino-organosilicon compound in producing the above-described aminosilicone-containing vinyl halide polymer coating compositions is not narrowly critical. The amount used is governed by such factors as the desired thickness of the coating to be produced from the composition and the desired viscosity of the coating composition. Generally from 15 to 2000 parts by weight of the organic solvent per 100 parts by weight of the vinyl halide polymer are preferred. From 200 to 900 parts by weight of the organic solvent per 100 parts by weight of the vinyl halide polymer are even more useful for solutions and from 40 to 100 parts by weight of the organic solvent per 100 parts by weight of the vinyl halide polymer are even more useful for organosols and plastisols.

Although the above-described aminosilicone-containing vinyl halide polymer coating compositions consist essentially of a film-forming vinyl halide polymer, an amino-organosilicon compound and an organic solvent, various additives can be incorporated into these compositions, if desired, to impart special properties to the compositions. By way of illustration, polymers other than the vinyl halide polymers or the above-described amino-organosiloxane (e.g., butyl acrylate polymers) can be added to the compositions to serve as fillers; stabilizers (e.g., epoxy compounds and organo tin compounds containing a thio linkage) can be added to the compositions to minimize thermal discoloration of the coatings produced from the compositions; volatile organic diluents in which the vinyl halide polymer is not particularly soluble even at elevated temperatures (e.g. aromatic hydrocarbons such as toluene, xylene and naphtha) can be added to the compositions to decrease the viscosity thereof; powdered metals or metal oxides (e.g. powdered titanium dioxide or antimony oxide and powdered aluminum) can be added to the compositions to impart color to the coatings produced therefrom or to render such coatings opaque. These additives can be added to these coating compositions in the same manner and in the same amounts as is customary in the conventional vinyl halide polymer coating composition art.

Should any of the above-mentioned epoxy additives react with the amino-organosilicon compound to convert the primary or secondary amino groups therein to tertiary amino groups, it is necessary to use more rigorous curing conditions (e.g. higher temperatures and longer times in curing) to produce an adherent coating. Apparently under these curing conditions the tertiary amino groups are converted to primary or secondary amino groups which have the nitrogen-bonded hydrogen atoms that are necessary to produce an adherent coating.

The above-described aminosilicone-containing vinyl halide polymer coating compositions can be applied to metal surfaces and cured thereon to produce remarkably adherent protective coatings thereon. Any suitable manner of application of the composition to the surface and any suitable manner of curing the composition can be employed. Thus the composition can be applied by brushing, dipping, knife coating, spraying, roller coating, or flooding and the compositions so applied can be cured (i.e., converted to solid, dry, non-tacky, continuous films or coatings) by exposure to atmospheric conditions or by heating to elevated temperatures. The latter method of curing is preferred. Curing temperatures from 165° C. to 260° C. are preferred but curing temperatures from 175° C. to 200° C. are even more useful. Curing involves fusion in the case of organosols and plastisols, volatilization of any volatile organic solvent, volatilization of any diluents and apparently also involves chemical reaction of nitrogen-bonded hydrogen atoms of the amino-organosilicon compound with halogen atoms of the vinyl halide polymer to produce a hydrogen halide.

Metal surfaces in which remarkably adherent coatings can be produced from the above-described aminosilicone-containing vinyl halide polymer coating compositions include the metals below sodium in the electromotive series (e.g., aluminum, magnesium, iron, copper, chromium, nickel, lead, tin and zinc) as well as alloys of such metals (e.g., tin solder, brass, bronze and steel). Such metal surfaces need not be pre-treated but, if desired the surfaces can be pre-treated by conventional means (e.g., treated with phosphates to prevent corrosion). Such metals are solids at 25° C. and normally become corroded when in prolonged contact with seated aqueous saline solutions or hot humid air. The compositions are particularly applicable to coating surfaces of iron and aluminum and the alloys of these metals.

The thickness of the coating produced on a metal surface with the above-described aminosilicone-containing vinyl halide polymer compositions is not narrowly critical and can be regulated by various means (e.g., by the number of applications of the composition to the surface, the relative amount of the vinyl halide polymer in the composition and the method of coating). In general, good adhesion and corrosion protection are obtained with coatings from 0.5 to 20 mils in thickness but coatings from 1.0 to 3.0 mils in thickness are preferred. Other coating thicknesses can be produced, if desired, but no commensurate advantage is gained thereby.

The following tests are referred to in the examples appearing below:

*Adhesion stripping test.*—This test measures the degree of adhesion of a vinyl halide polymer coating to a metal surface. Two parallel slits that are one eighth of an inch apart are made in the coating. The slits are 1.5 to 2.0 inches long and extend through the coating to the metal surface. A third slit that also extends through the coating to the surface, that is perpendicular to the other slits and that bisects the other slits is also made in the coating. It is attempted to strip the coating from the surface by grasping the part of the coating delineated by the slits. Good adhesion is indicated if the coating ruptures rather than being stripped from the surface. Fair adhesion is indicated if the coating can only be stripped with difficulty. Poor adhesion is indicated if the coating can be stripped easily.

*Impact test.*—This test measures the impact strength of a vinyl halide polymer coating on a metal surface. A commercially available Gardner Impact Tester is used. The tester operates by dropping a rounded one pound rod onto the coated surface from successively greater heights till failure of the coating occurs. The impact is measured in inch-pounds.

The following definitions apply to the phrases that are employed for brevity in the examples appearing below:

*Vinyl chloride polymer I.*—This is a homopolymeric vinyl chloride polymer that has a specific viscosity of 0.260 (measured using one gram of the polymer dissolved in 100 milliliters of nitrobenzene).

*Vinyl chloride polymer II.*—This is a copolymeric vinyl chloride polymer that is composed of about 86 parts by weight of copolymerized vinyl chloride per 100 parts by weight of the polymer and about 14 parts by weight of copolymerized vinyl acetate per 100 parts by weight of the polymer. It has a specific viscosity of 0.56 (measured using one gram of the polymer dissolved in 100 milliliters of methyl isobutyl ketone).

*Vinyl chloride polymer III.*—This is a homopolymeric vinyl chloride polymer that has a specific viscosity of 0.225 (measured using one gram of the polymer dissolved in 100 milliliters of nitrobenzene).

*Solvent mixture I.*—This is an organic solvent composed of 92 wt.-percent of aromatic hydrocarbons and 8 wt.-percent of aliphatic hydrocarbons (trade name "Solvesso No. 100").

*Stabilizer I.*—This is the diglycidyl ether of 4,4′-dihydroxydiphenyl-2,2-propane having an epoxy equivalent of 180.

*Stabilizer II.*—This is a polymeric organo tin stabilizer containing a thio linkage. It is commercially available under the trade name "Advance 17M Stabilizer."

The following examples illustrate the present invention.

Example I

To eighteen pounds of a vinyl chloride polymer latex (composed of about 33 wt.-percent of vinyl chloride polymer I, about 0.2 wt.-percent of a surfactant and about 66.8 wt.-percent water) that had been produced by the conventional emulsion polymerization procedure was added 6.5 pounds of a solution containing a stabilizing surfactant (1.86 wt.-percent of sodium tetradecyl sulfate dissolved in 98.14 wt.-percent of water). To the mixture so formed was slowly added 817 grams of an aqueous gamma-aminopropylsiloxane solution (i.e., a siloxane composed of $N_2N(CH_2)_3SiO_{1.5}$ groups) that had been prepared by dissolving 1.67 wt.-percent of gamma-aminopropyltriethoxysilane in 98.33 wt.-percent of water. The siloxane solution was added through a tube that extended under the surface of the latex and the latex was thoroughly agitated during the addition of the siloxane solution. The latex remained fluid and no thickening or precipitation had occurred. After all of the siloxane solution had been added, the latex was agitated for an additional fifteen minutes. The latex was then spray dried by conventional methods and the dried product was ground in a hammer mill to produce an admixture of the gamma-aminopropylsiloxane and the vinyl chloride polymer having an average particle size of about 5 to 10 microns.

An organosol (denoted organosol A) was prepared by mixing the above-described admixture, vinyl chloride polymer II organic solvents (diisobutyl ketone and solvent mixture I) and various additives in the amounts shown below.

| Components of organosol A: | Amount (parts by weight) |
| --- | --- |
| Above-described admixture | [1] 100.00 |
| Vinyl chloride polymer II | 30.0 |
| Titanium dioxide | 67.5 |
| Antimony oxide | 7.5 |
| Di(2-ethylhexyl)phthalate | 30.0 |
| Diisobutyl ketone | 67.7 |
| Toluene | 70.9 |
| Solvent mixture I | 55.5 |
| Stabilizer I | 3.0 |
| Stabilizer II | 2.0 |

[1] Containing an amount of gamma-aminosiloxane equivalent to 0.5 part by weight per 100 parts by weight of vinyl chloride polymer I of the gamma-aminopropyltriethoxysilane.

One portion of organosol A was applied to a Bonderized steel surface (Bonderized denotes pre-treatment with chromates to inhibit corrosion) by conventional spray coating methods and the surface so treated was heated for 10 minutes at 350° F. to produce a coating on the surface. The coating was about 1 to 1.5 mils thick and exhibited good adhesion in the adhesion stripping test and good flexibility.

Another portion of organosol A was applied by conventional spray coating methods to an aluminum surface that had been previously treated with chromates to inhibit corrosion, and the surface so treated was heated for five minutes at 350° F. The coating so produced was about 1 to 1.5 mils thick and exhibited excellent adhesion in the adhesion stripping test and good flexibility. The coated aluminum surface was then placed in a cabinet where it was exposed to a spray of hot saline water (5 wt.-percent NaCl dissolved in 95 wt.-percent water) for 200 hours.

An otherwise identical organosol was formed by adding gamma-aminopropyltriethoxysilane (2.0 parts by weight per 100 parts by weight of the vinyl chloride polymer I) after the vinyl chloride resin and the organic solvents had been mixed. The coatings on a Bonderized steel surface and on a treated aluminum surface produced from the latter organosol were substantially the same in regard to adhesion and flexibility as was coatings produced on such surfaces using organosol A.

An otherwise identical organosol that was free of amino-organosilicon compounds was applied as described above to similar Bonderized steel surfaces and treated aluminum surfaces. The coatings so produced exhibited little or no adhesion to the surfaces in the adhesion stripping test.

Example II

An organosol was prepared in the same manner as organosol A except that four times the amount of the aqueous gamma-aminopropylsiloxane solution was added to the latex. When applied to metal surfaces and cured, this organosol formed coatings on the surfaces that were substantially as flexible and as adherent when tested in the adhesion stripping test as those formed with organosol A.

Example III

*Part A.*—To 210 grams of a vinyl chloride polymer latex (composed of 0.7 wt.-percent of a surfactant, 33 wt.-percent of vinyl chloride polymer III and 66.3 wt.-percent of water) that had been prepared by conventional emulsion polymerization methods was added 21 grams of an aqueous gamma-aminopropylsiloxane solution that had been prepared by dissolving 1.67 parts by weight of gamma-aminopropyltriethoxysilane in 98.33 parts by weight of water. The solution was added by spraying it onto the surface of the latex while the latex was agitated. The latex was agitated for 15 minutes after the addition and was allowed to stand for 24 hours. No precipitate had separated or thickening had occurred at the end of this time. One half part by weight of the silane per 100 parts by weight of the vinyl chloride polymer III in the 210 grams of latex had been used in forming the 21 grams of siloxane solution that was added to the latex.

*Part B.*—When 0.35 milliliter of gamma-aminopropyltriethoxysilane was added with agitation to another portion of the latex used as a starting material in Part A, no precipitate or thickening had occurred after the resulting admixture was allowed to stand for 24 hours. After that time, agitation caused thickening. One half part by weight of the silane per 100 parts by weight of the vinyl chloride polymer III in the portion of the latex had been used.

*Part C.*—When 1.4 milliliters of the same silane were added to another portion of the latex as in Part B, the latex thickened almost at once. Two parts by weight of the silane per 100 parts by weight of the vinyl chloride polymer III in this portion of the latex had been used.

The latter example illustrates the relationship between silane concentration and mode of addition of the silane (i.e., in solution or as such) and the fluidity of these systems.

Example IV

*Part A.*—To 210 grams of the latex used in Example I was added 70 grams of deionized water. To the diluted latex were added 21 grams of an aqueous gamma-aminopropylsiloxane solution that had been prepared by dissolving 1.67 parts by weight of gamma-aminopropyltriethoxysilane in 98.33 parts by weight of water. The siloxane solution was sprayed onto the surface of the agitated latex. The admixture so formed was initially fluid but thickened when stirred for 15 minutes. One half part by weight of the silane per 100 parts by weight of the vinyl chloride polymer I in the 210 grams of latex had been used in forming the 21 grams of siloxane solution.

*Part B.*—When an additional 20 grams of deionized water is used in the initial dilution of the latex, the final admixture remains fluid when stirred for 15 minutes.

The latter example shows the relationship between dilution and the fluidity of these systems.

Example V

*Part A.*—To 210 grams of the latex used in Example I was added 18.8 grams of a stabilizing surfactant solution containing 1.86 parts by weight of sodium dioctyl sulfosuccinate dissolved in 98.14 parts by weight of water. Twenty-one grams of an aqueous gamma-aminopropylsiloxane solution (formed by dissolving 1.67 parts by weight of gamma-aminopropyltriethoxysilane in 98.33 parts by weight of water) were slowly added to the agitated latex. The admixture so formed was agitated for 15 minutes and was observed to thicken.

*Part B.*—When Part A was repeated but 16.2 grams of deionized water was added to the latex before the addition of the stabilizing surfactant solution, the final admixture not only failed to thicken after stirring for 15 minutes, but also failed to thicken after standing for 24 hours.

The latter example illustrates the relationship between dilution and fluidity in these systems.

The fluid (non-thickened) admixtures produced in Examples III, IV and V can be spray dried and ground by conventional procedures and the dried admixtures so produced can be mixed with organic solvents as described herein above to produce compositions that are suitable for producing adherent coatings on metal surfaces.

Example VI

One hundred parts by weight of vinyl chloride polymer I (average particle size about for microns) were blended with 2 parts by weight of gamma-aminopropyltriethoxysilane. The admixture so formed was used to produce a coating composition that was in the form of an organosol and that contained the following components.

| Component: | Amount (parts by weight) |
|---|---|
| Latter-mentioned admixture | 100 |
| Titanium dioxide | 67.5 |
| Antimony dioxide | 7.5 |
| Di(octyl)phthalate | 30 |
| Vinyl chloride polymer II | 30 |
| Methyl isobutyl ketone | 27 |
| Diisobutyl ketone | 57 |
| Solvent mixture I | 155 |

The various components were mixed on a mill.

The organosol so formed was applied to a steel surface by conventional spray coating methods and cured thereon by heating at 350° F. for 5 minutes to produce a coating 1 to 1.5 mils thick. The coating exhibited excellent adhesion in the adhesion stripping test and withstood an impact of 160 inch-pounds in the impact test.

Equivalent results are obtained when

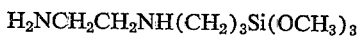

or $H_2N(CH_2)_3NH(CH_2)_3Si(OCH_3)_3$ is substituted for gamma-aminopropyltriethoxysilane in the process described in Example VI.

The admixture of the vinyl chloride polymer I and the gamma-aminopropyltriethoxysilane used in Example VI was formed in the following manner. Dry vinyl chloride polymer I (100 parts by weight) was placed in a Hobart mixer and the silane (2 parts by weight) was added slowly thereto with mixing. After the addition of the silane had been completed the mixing was continued for ten minutes. The entire mixing operation was performed at room temperature.

What is claimed is:

1. In a process for producing a coating composition which process comprises forming a mixture of (1) a film-forming vinyl halide polymer: (2) an amino organosilicon compound selected from the group consisting of:

A. A silane represented by the formula:

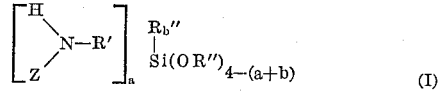

wherein Z is a member selected from the group consisting of the hydrogen atom and a monovalent hydrocarbon group having from 0 to 1 amino groups, from 0 to 1 hydroxy groups and from 0 to 1 hydrocarbonoxy groups as substitutents, R' is a divalent hydrocarbon group, R'' is a monovalent hydrocarbon group, the

group is attached to the silicon atom through at least three successive carbon atoms of the group represented by R', $a$ has a value from 1 to 3 inclusive, $b$ has a value from 0 to 2 inclusive and $(a+b)$ has a value from 1 to 3 inclusive, B. A siloxane consisting essentially of groups represented by the formula:

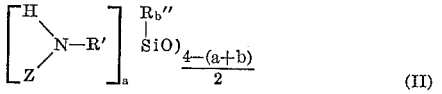

wherein Z, R', R'', $a$, $b$, $(a+b)$ and the position of the

group are as defined above, and

C. Copolymeric siloxanes consisting of from 25 to 99.9 mole percent of groups represented by Formula II and from 0.1 to 75 mole percent of groups represented by formula:

$$R_c'''SiO_{4-c/2} \quad (III)$$

wherein R''' is a monovalent hydrocarbon group and $c$ has a value from 0 to 3 inclusive; and (3) an organic solvent, said solvent comprising at least one liquid organic compound in which the vinyl halide polymer is soluble and that provides the continuous phase in the composition, said composition containing from 0.05 to 25 parts by weight of the amino-organosilicon compound per 100 parts by weight of the vinyl halide polymer and said composition containing from 15 to 2000 parts by weight of the organic solvent per 100 parts by weight of the vinyl halide polymer, the improvement which comprises forming an admixture of the vinyl halide polymer and the amino-organosilicon compound in the absence of the organic solvent prior to mixing the admixture so formed with the organic solvent to produce the coating composition.

2. The process of claim 1 wherein the amino-organosilicon compound is blended with a dry vinyl halide polymer to produce the admixture.

3. The process of claim 1 wherein the amino-organosilicon compound is added to the vinyl halide polymer which is suspended in water and the product so formed is dried to produce the admixture.

4. The process of claim 1 wherein the amino-organosilicon compound is a silane represented by Formula II and the vinyl halide polymer is a vinyl chloride polymer.

5. The process of claim 1 wherein the amino-organosilicon compound is a siloxane consisting essentially of groups represented by Formula II and the vinyl halide polymer is a vinyl chloride polymer.

6. The process of claim 1 wherein the amino-organosilicon compound is said copolymeric siloxane and the vinyl halide polymer is a vinyl chloride polymer.

7. The process of claim 1 wherein R′ is an alkylene group containing from 3 to 5 carbon atoms inclusive and the vinyl halide polymer is a homopolymeric vinyl chloride polymer.

8. The process of claim 1 wherein R′ is an alkylene group containing from 3 to 5 carbon atoms inclusive and the vinyl halide polymer is a copolymeric vinyl chloride polymer consisting essentially of at least 60 parts by weight of copolymerized vinyl chloride and up to 40 parts by weight of another copolymerized olefinically unsaturated compound, said parts by weight being based on 100 parts by weight of the polymer.

9. The process of claim 8 wherein the copolymerized compounds are vinyl chloride and vinyl acetate.

10. The process of claim 8 wherein the copolymerized compounds are vinyl chloride and vinylidene chloride.

11. The process of claim 1 wherein the amino-organo-silicon compound is gamma-aminopropyltriethoxysilane.

12. The process of claim 1 wherein the amino-organo-silicon compound is composed of groups having the formula:

$$H_2N(CH_2)_3SiO_{1.5}$$

13. The admixture formed in accordance with the process of claim 1.

References Cited by the Examiner

UNITED STATES PATENTS

| | | | |
|---|---|---|---|
| 2,884,388 | 4/1959 | Hedlund | 260—45.5 |
| 2,921,950 | 1/1960 | Jex et al. | 260—46.5 |
| 2,930,809 | 3/1960 | Jex et al. | 260—46.5 |
| 3,085,908 | 4/1963 | Morehouse et al. | 260—448.2 |
| 3,088,847 | 5/1963 | Pines | 260—448.2 |

MORRIS LIEBMAN, *Primary Examiner.*

DANIEL ARNOLD, *Examiner.*